United States Patent
Pan et al.

(10) Patent No.: US 8,686,956 B2
(45) Date of Patent: Apr. 1, 2014

(54) CAPACITIVE TOUCH SENSING STRUCTURE AND SENSING METHOD THEREOF

(75) Inventors: Hsuan-I Pan, Hsinchu Hsien (TW); Guo-Kiang Hung, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 308 days.

(21) Appl. No.: 12/780,668

(22) Filed: May 14, 2010

(65) Prior Publication Data
US 2010/0289774 A1    Nov. 18, 2010

Related U.S. Application Data

(60) Provisional application No. 61/178,506, filed on May 15, 2009.

(51) Int. Cl.
*G06F 3/041* (2006.01)
(52) U.S. Cl.
USPC ............... 345/173; 178/18.01; 178/19.01
(58) Field of Classification Search
USPC ............... 178/18.01–19.07; 345/173–178
See application file for complete search history.

(56) References Cited

U.S. PATENT DOCUMENTS

| | | | | | |
|---|---|---|---|---|---|
| 4,659,874 | A | * | 4/1987 | Landmeier | 178/18.03 |
| 6,297,811 | B1 | * | 10/2001 | Kent et al. | 345/173 |
| 2007/0257894 | A1 | * | 11/2007 | Philipp | 345/173 |
| 2007/0268266 | A1 | * | 11/2007 | XiaoPing | 345/173 |
| 2009/0073135 | A1 | * | 3/2009 | Lin et al. | 345/173 |

* cited by examiner

*Primary Examiner* — Michael Pervan
(74) *Attorney, Agent, or Firm* — Han IP Corporation (57) ABSTRACT

A capacitive touch sensing structure includes: a substrate; a plurality of first electrode groups arranged from a first position towards a second position in a first direction, wherein each of the first electrode groups includes a plurality of first electrodes extended from a third position towards a fourth position in a second direction; a plurality of first conducting wires each having a plurality of contacts respectively coupled to the first electrodes of each of the first electrode groups; a plurality of second electrode groups arranged from the first position towards the second position in the first direction, wherein each of the second electrode groups includes a plurality of second electrodes extended from the fourth position towards the third position in the second direction and respectively staggering with the first electrode groups; and a plurality of second conducting wires each having a plurality of contacts respectively coupled to the electrodes of each of the second electrode groups.

20 Claims, 8 Drawing Sheets

CAPACITIVE TOUCH SENSING STRUCTURE AND SENSING METHOD THEREOF

CROSS REFERENCE TO RELATED PATENT APPLICATIONS

This patent application claims priority from U.S. Provisional Patent Application No. 61/178,506 filed on May 15, 2009, which is hereby incorporated in its entirety by reference.

TECHNICAL FIELD

The present disclosure relates to capacitive touch sensing, and more particularly, to a capacitive touch sensing structure and a sensing method thereof.

BACKGROUND OF THE PRESENT DISCLOSURE

As science and technology continue to develop, touch panels are widely applied to various types of electronic apparatuses. In addition to replacing buttons, use of touch panels generally allow electronic apparatuses to also benefit from enlarged display images.

Common touch panels in general are classified into various types including a resistive type, a capacitive type, an infrared type, and an ultrasonic type, for example. Since a capacitive touch panel includes advantageous features such as being dustproof and scratchproof as well as having a high-resolution, the number of electronic apparatus equipped with a capacitive touch panel has been on the rise.

A principle of the capacitive touch panel is that a layer of transparent conductive film (e.g., an antimony tin oxide (ATO) layer), placed on a glass substrate, serves as a sensing structure. When a user touches the capacitive touch panel with his finger, close proximity the finger to the touch panel causes variations in capacitance in the sensing structure and coupling capacitance within the sensing structure. The capacitive touch panel determines a location of the touch on the capacitive touch panel according to the capacitance variations in the sensing structure.

Figure 1A:
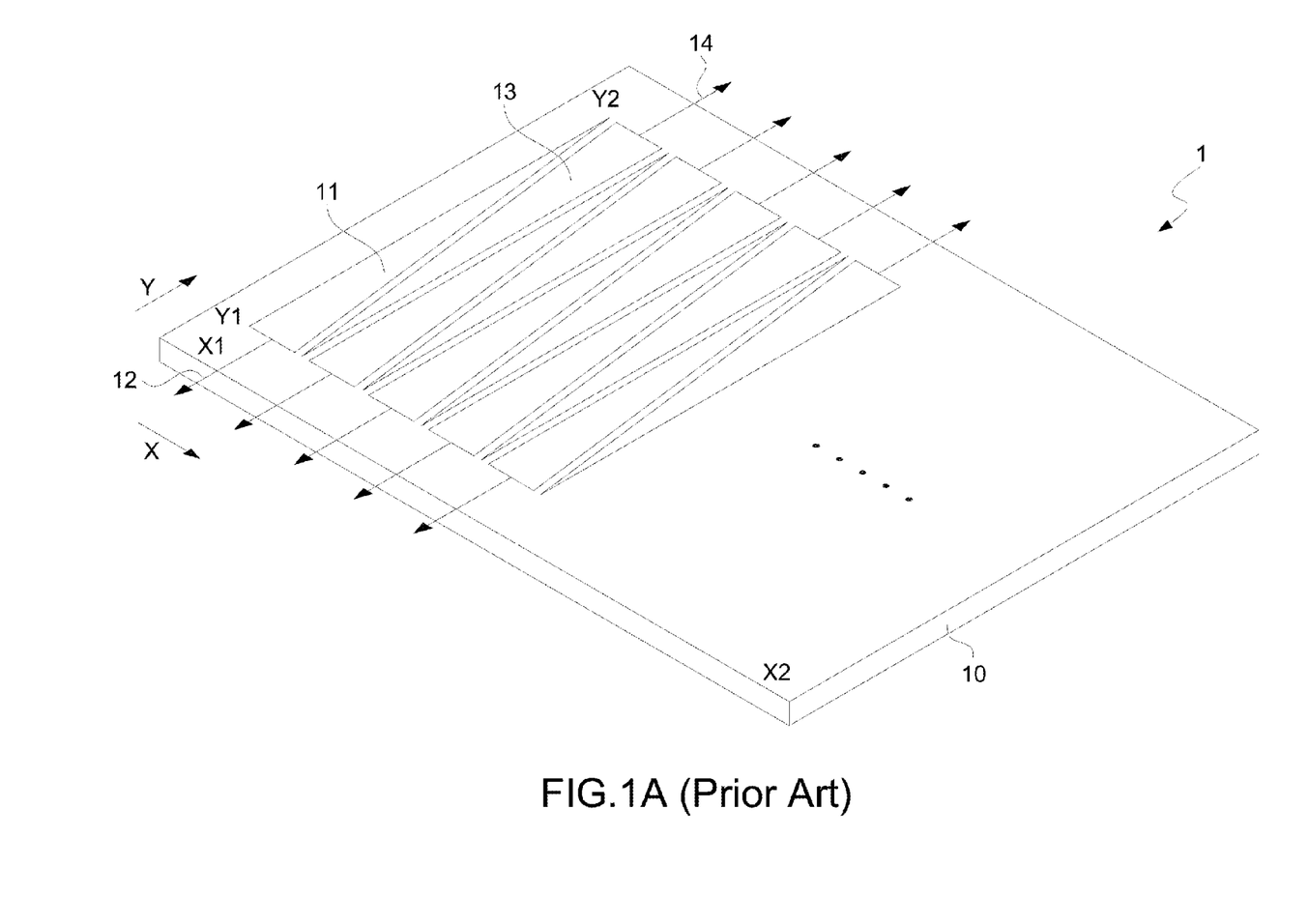
FIGS. 1A and 1B are schematic diagrams of a capacitive touch panel in the prior art.

FIG. 1A shows a prior art capacitive touch sensing structure 1. The sensing structure 1 includes a substrate 10, a plurality of first electrodes 11, a plurality of first conducting wires 12, a plurality of second electrodes 13 and a plurality of second conducting wires 14.

A first direction X points from a first position X1 to a second position X2, and a second direction Y points from a first position Y1 to a second position Y2.

The first electrodes 11 are arranged in sequence from the first position X1 towards the second position X2 in the first direction X of the substrate 10. Each of the first electrodes 11, a triangular electrode, has its bottom located at the first position Y1 in the second direction Y of the substrate 10, and its top extended towards the second position Y2.

The first conducting wires 12 are respectively electrically connected with the first electrodes 11.

The second electrodes 13 are arranged in sequence from the first position X1 towards the second position X2 in the first direction X of the substrate 10. Each of the second electrodes 13, a triangular electrode, has its bottom located at the second position Y2 of the substrate 10, and its top extended towards the first position Y1. Further, the second electrodes 13 are staggered with the first electrodes 11 in an electrically isolated manner from each other.

The second conducting wires 14 are respectively electrically connected to the second electrodes 13.

Figure 1B:
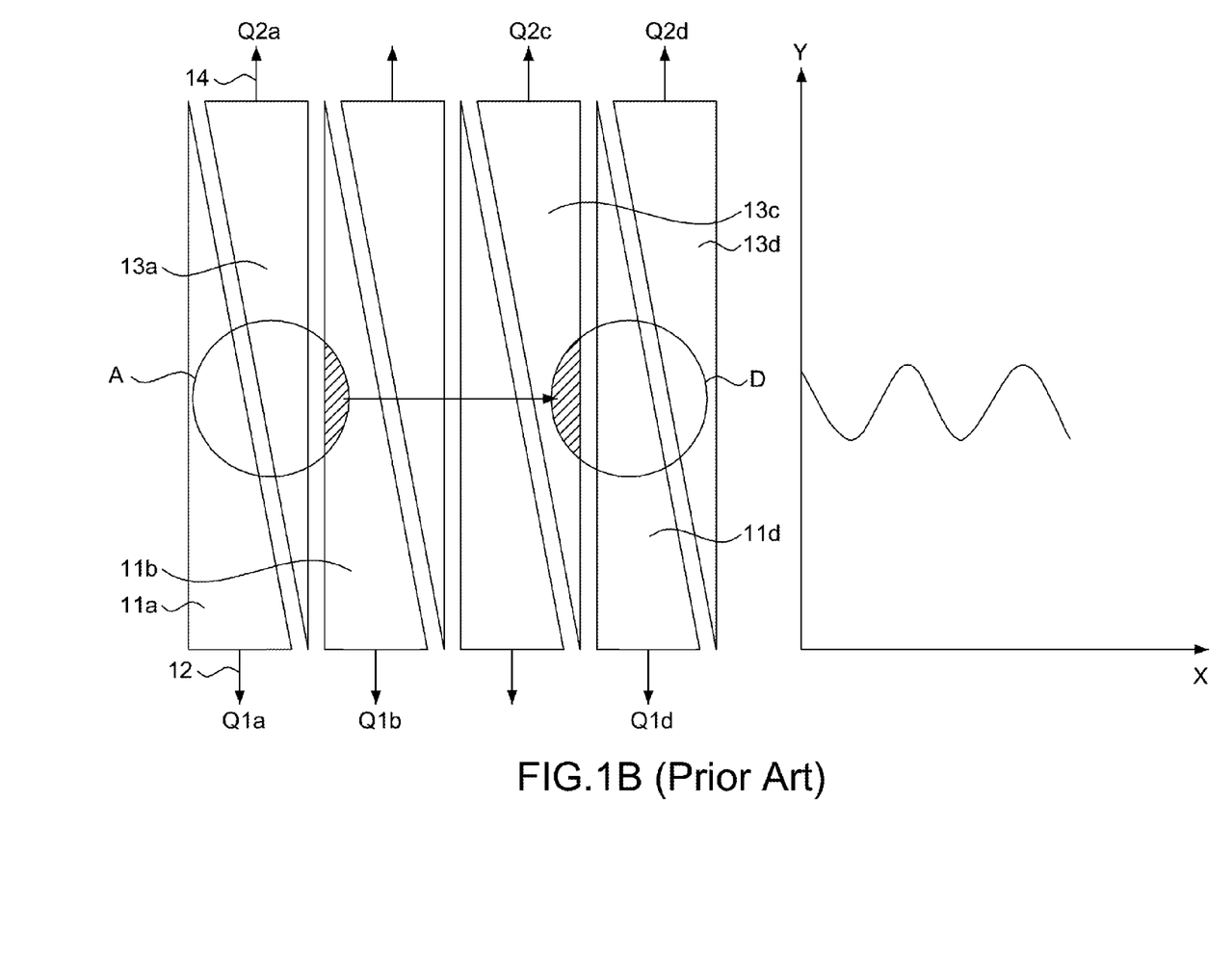

Referring to FIG. 1B, when a user touches an area A of a capacitive touch panel with his finger, the capacitive touch panel senses a capacitance variance Q1$a$ of a first electrode 11$a$ and a capacitance variance Q2$a$ of a second electrode 13$a$, and regards a capacitance variance Q1$b$ of a first electrode 11$b$ as an error term. A capacitance variance is proportional to a touched area, and a touched area of the first electrode 11$a$ touched by the finger of the user, determined by an associated circuit, is greater than an actual touched area due to the error term contributed by the capacitance variance Q1$b$ of the first electrode 11$b$. Therefore, a position in the second direction Y, by sensing the capacitance variance in the area A, is determined to be lower than an actual touched position.

When the user touches an area D of the capacitive touch panel with his finger, the capacitive touch panel senses a capacitance variance Q1$d$ of a first electrode 11$d$ and a capacitance variance Q2$d$ of a second electrode 13$d$, and regards a capacitance variance Q2$c$ of a second electrode 13$c$ as an error term. Therefore, a position in the second direction Y, by sensing the capacitance variance in the area D, is determined to be higher than an actual touched position.

Therefore, when the user moves the finger in the first direction X on the capacitive touch panel, a position in the second direction Y, sensed by a conventional capacitive touch panel, varies up and down. A reason for such phenomenon lies in changes due to omitted error terms in the process of calculating the second direction Y in the prior art with an error up to 10 mm.

In the prior art, in order to reduce the error and increase accuracy of the capacitive touch panel, more finer first electrodes and second electrodes are provided on the substrate 10. However, more electrodes need more conducting wires. Corresponding detection circuit is complex and the number of pins connected to electrodes is increased, leading to increased production cost.

Therefore, without increasing extra conducting wires, a capacitive touch sensing structure and a sensing method thereof capable of more accurately obtaining a touched position on the capacitive touch panel are needed.

SUMMARY OF THE PRESENT DISCLOSURE

A main object of the present disclosure is to provide a capacitive touch sensing structure and a sensing method thereof, so that a touched position is accurately obtained without increasing extra conducting wires.

In order to achieve the above object, a capacitive touch sensing structure according to the present disclosure comprises a substrate, a plurality of first electrode groups, a plurality of first conducting wires, a plurality of second electrode groups, and a plurality of second conducting wires.

The substrate comprises a first direction (an X direction) and a second direction (a Y direction)—the first direction extends from a first position X1 to a second position X2, and the second direction extends from a first position Y1 to a second position Y2.

The electrode groups are arranged in sequence from the first position X1 towards to the second position X2 in the first direction X. Each of the electrode groups comprises a plurality of first electrodes, which are triangular electrodes or trapezoid electrodes, and each of the first electors has a bottom located at the first position Y1 in the second direction X, and a top extended toward the second position Y2.

Each of the first conducting wires comprises a plurality of contacts, which are respectively coupled to the first electrodes of each of the first electrodes groups.

The second electrodes groups are arranged in sequence from the first position X1 towards to the second position X2 in the first direction X. Each of the second electrodes groups comprises a plurality of second electrodes, which are triangular or trapezoid in shape. Each of the second electrodes has a bottom located at the second position Y2 of the second direction Y of the substrate, and a top extended to the first position Y1. Further, the second electrodes are staggered with the plurality of first electrodes in an electrically isolated manner from each other.

Each of the second conducting wires comprises a plurality of contacts, which are respectively coupled to a plurality of second electrodes of each of the second electrodes groups.

A sensing method according to the present disclosure comprises touching an area on a substrate of a touch panel by an external object, e.g., a finger touch of a user; sensing a first capacitance variance of a plurality of first electrode groups and a second capacitance variance of a plurality of second electrode groups in the area; estimating a position in a second direction of the area on the substrate according to a ratio between the first capacitance variance of the first electrode groups and the second capacitance variance of the second electrode groups.

The advantages and spirit related to the present disclosure can be further understood via the following detailed description and drawings.

DETAILED DESCRIPTION OF THE PREFERRED EMBODIMENTS

Figure 2A:
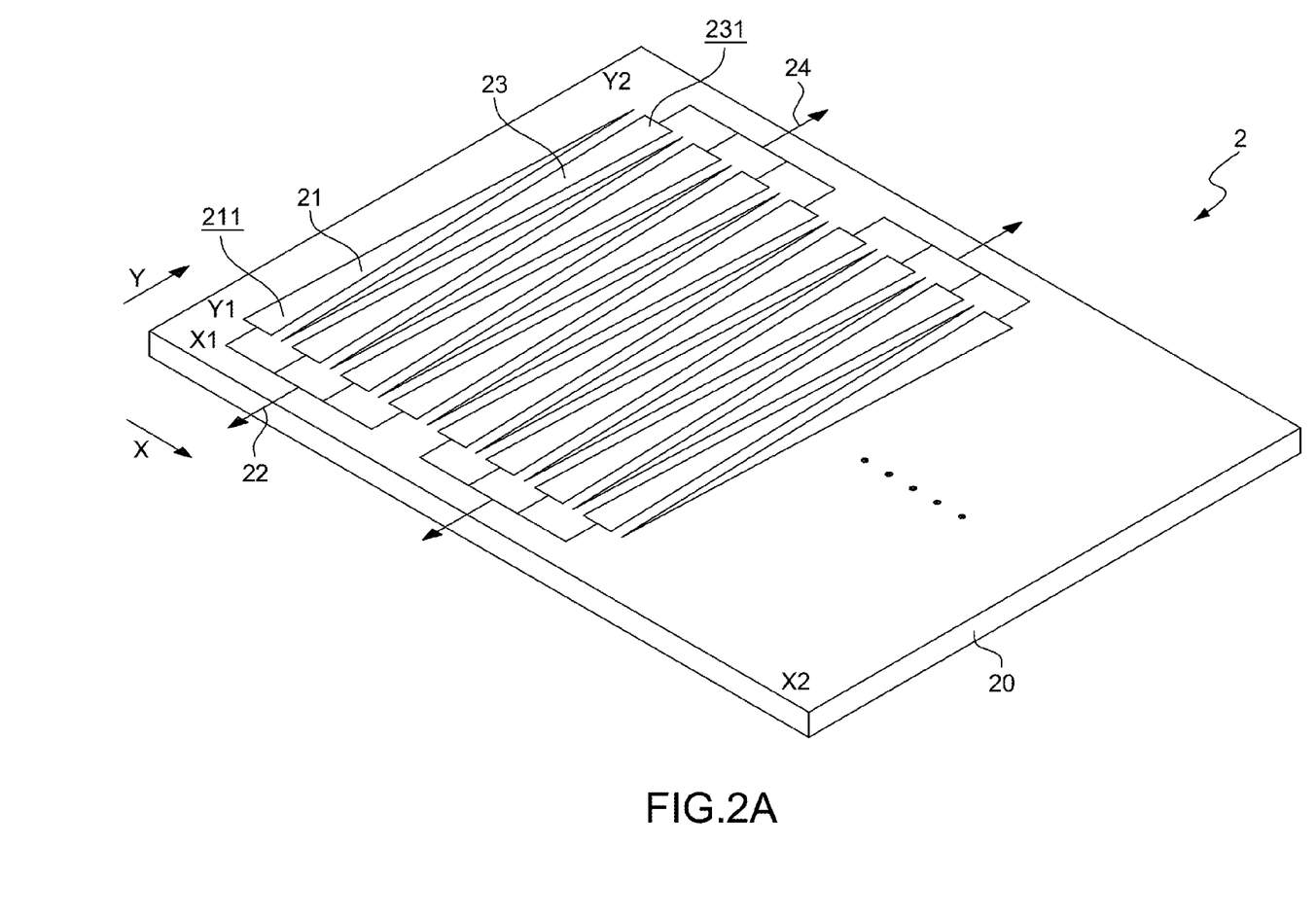
FIGS. 2A and 2B are a capacitive touch sensing structure in accordance with a first embodiment of the present disclosure.

FIG. 2A shows a capacitive touch sensing structure 2 in accordance with a first embodiment of the present disclosure. The sensing structure 2 comprises a substrate 20, a plurality of first electrode groups 21, a plurality of first conducting wires 22, a plurality of second electrode groups 23, and a plurality of second conducting wires 24.

The substrate 20 can be in shape of a rectangle and comprises a first direction X and a second direction Y. The first direction X directs from a first position X1 to a second position X2, and the second direction Y directs from a first position Y1 to a second position Y2.

The first electrode groups 21 are arranged in sequence from the first position X1 towards the second position X2 in the first direction X. Each of first electrode groups 21 comprises a plurality of first electrodes 211, which are triangular or trapezoid in shape. Each of the first electrodes has its bottom located at the first position Y1 of the second direction Y of the substrate 20, and its top extended towards the second position Y2. In this embodiment, each of first electrode groups 21 comprises four first electrodes 211 each having a length as that of a forefinger of an adult person, and each of the first electrodes 211 has its top reaching the second position Y2 of the second direction Y.

Each of the first conducting wires 22 comprises a plurality of contacts (four in FIG. 2A), which are respectively electrically connected to the plurality of first electrodes 211 of each of the first electrodes groups 21.

The second electrode groups 23 are arranged in sequence from a first position X1 towards the second position X2 in the first direction X of the substrate 20. Each of the second electrode groups 23 comprises a plurality of second electrodes 231, which are triangular or trapezoid in shape. Each of the second electrodes 231 has its bottom located at the second position Y2 of the second direction Y of the substrate 20, and its top extended to the first position Y1. The second electrode groups 23 are staggered with the first electrode groups 21 in an electrically isolated manner from each other. In this embodiment, each of the second electrode groups 23 comprises four second electrodes 231. Preferably, each of the second electrodes 231 has a width approximately as that of a forefinger of an adult person, and its top reaching the first position Y1 of the second direction Y.

Each of the second conducting wires 24 comprises a plurality of contacts (four in FIG. 2A) respectively electrically connected to the plurality of second electrodes 231 of each of the second electrode groups 23.

In this embodiment, the capacitive touch sensing structure 2 can be applied to a display panel of an electronic apparatus with touch control and display functions. Preferably, the substrate 20 is a transparent glass substrate, and the foregoing first electrodes 211 and second electrodes 231 are transparent electrodes, e.g., indium tin oxide (ITO) or antimony tin oxide (ATO) film electrodes. The capacitive touch panel can be also a touch panel, which is implemented in a laptop computer but offers no display capability, so that the substrate 20 and the first and second electrodes 211 and 231 need not be transparent.

Figure 2B:
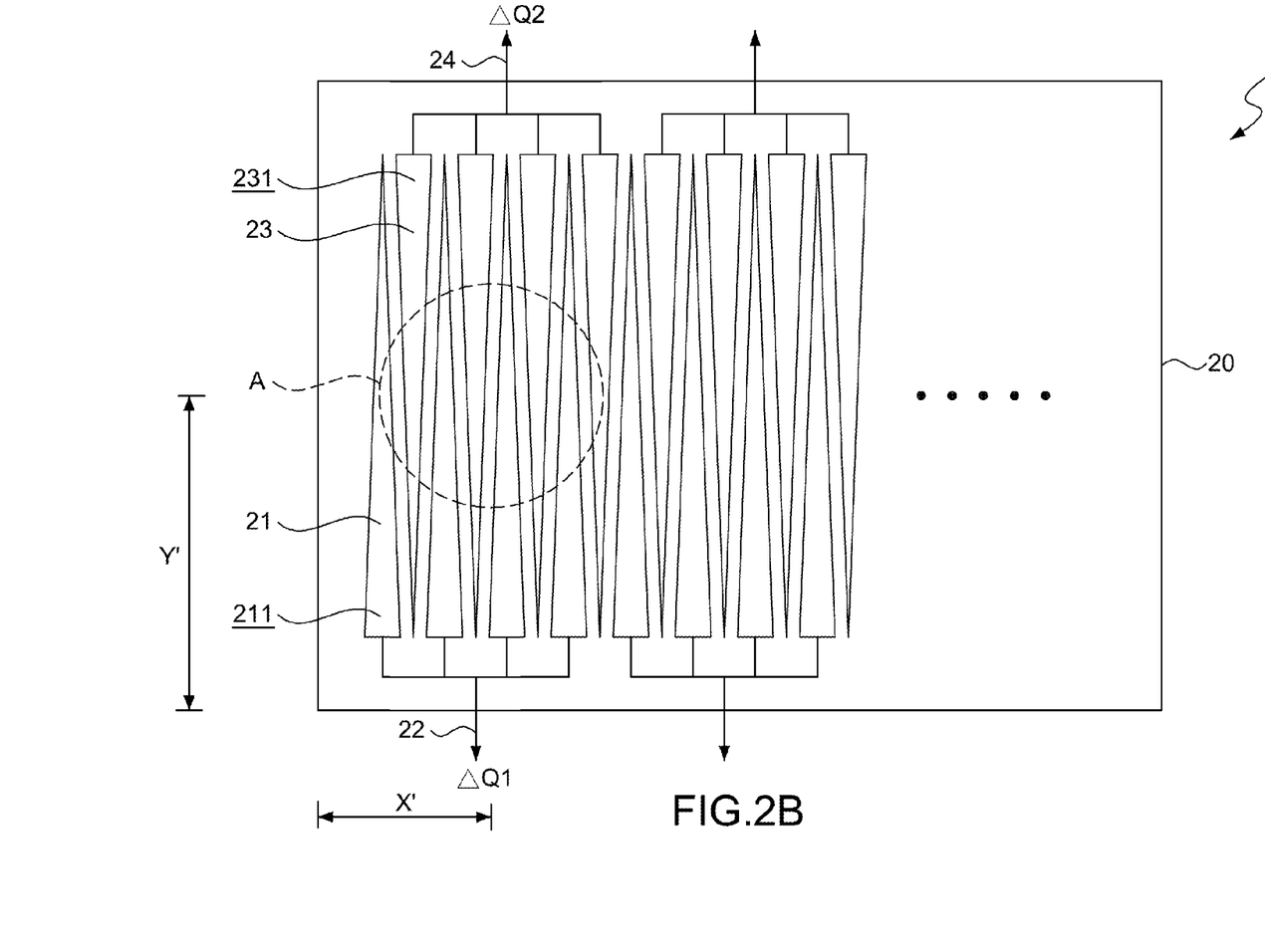
Figure 2C:
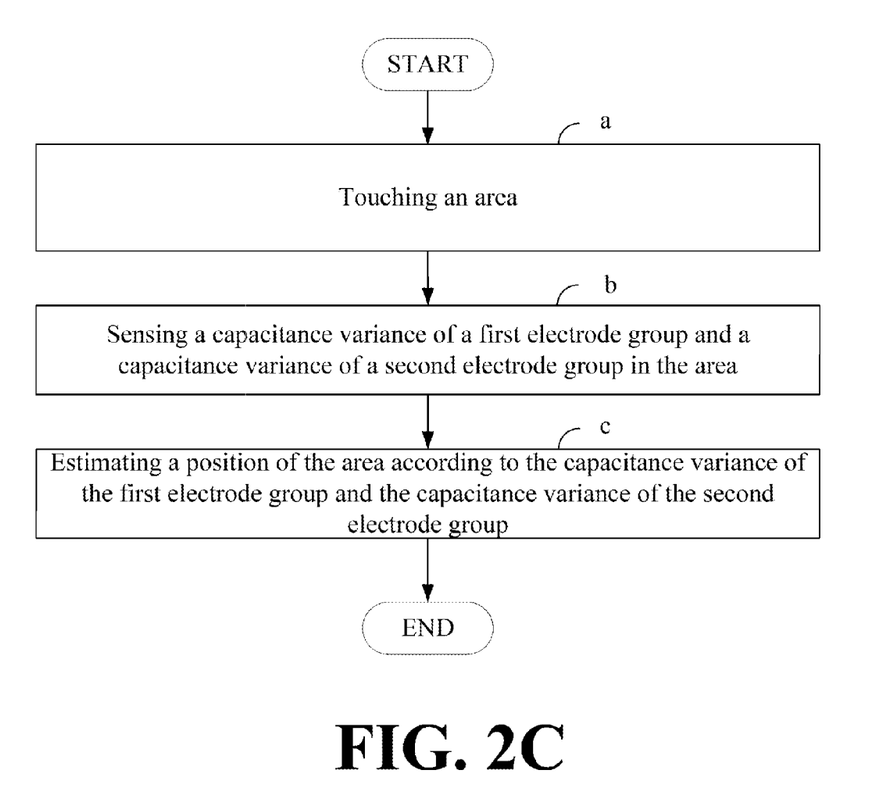
FIG. 2C is a flow chart of a sensing method in accordance with an embodiment of the present disclosure.

FIG. 2C shows a flow chart of a sensing method in accordance with an embodiment of the present disclosure. The flow chart in FIG. 2C is to be described also with reference to FIG. 2B.

In Step a, an area A on the substrate 20 of the touch panel is touched by an external object, e.g., a finger of a user. At this point, a coupling capacitor is formed between the user and the touch panel, and an equivalent capacitance of the area A is changed. The change in capacitance, i.e., the capacitance variance, is associated with the finger touched area A having a range covering a first electrode group 21 and a second electrode group 23.

In Step b, a capacitance variance $\Delta Q1$ of the first electrode group 21 and a capacitance variance $\Delta Q2$ of the second electrode group 23 in the area A are sensed.

In Step c, according to a ratio between the capacitance variance $\Delta Q1$ of the first electrode group 21 and the capacitance variance $\Delta Q2$ of the second electrode group 23, a position (Y') of the area A in the second direction of the substrate 20 is estimated.

A position (X') of the area A in the first direction X of the substrate 20 is obtained according to positions of the first electrode groups 21 and the second electrode groups 23 in the first direction X where the change of capacitance occurs.

In Step c, the capacitance variance $\Delta Q1$ is a sum of all capacitance variances of the first electrodes 211 of the first electrode group 21, and the capacitance variance $\Delta Q2$ is a sum of all capacitance variances of the second electrodes 231 of the second electrode group 23.

However, the range of the finger touched area A on the substrate 20 may simultaneously cover two first electrode groups 21 and two second electrode groups 23. The sensing method provided by the present disclosure for the above situation is described below.

Figure 3:
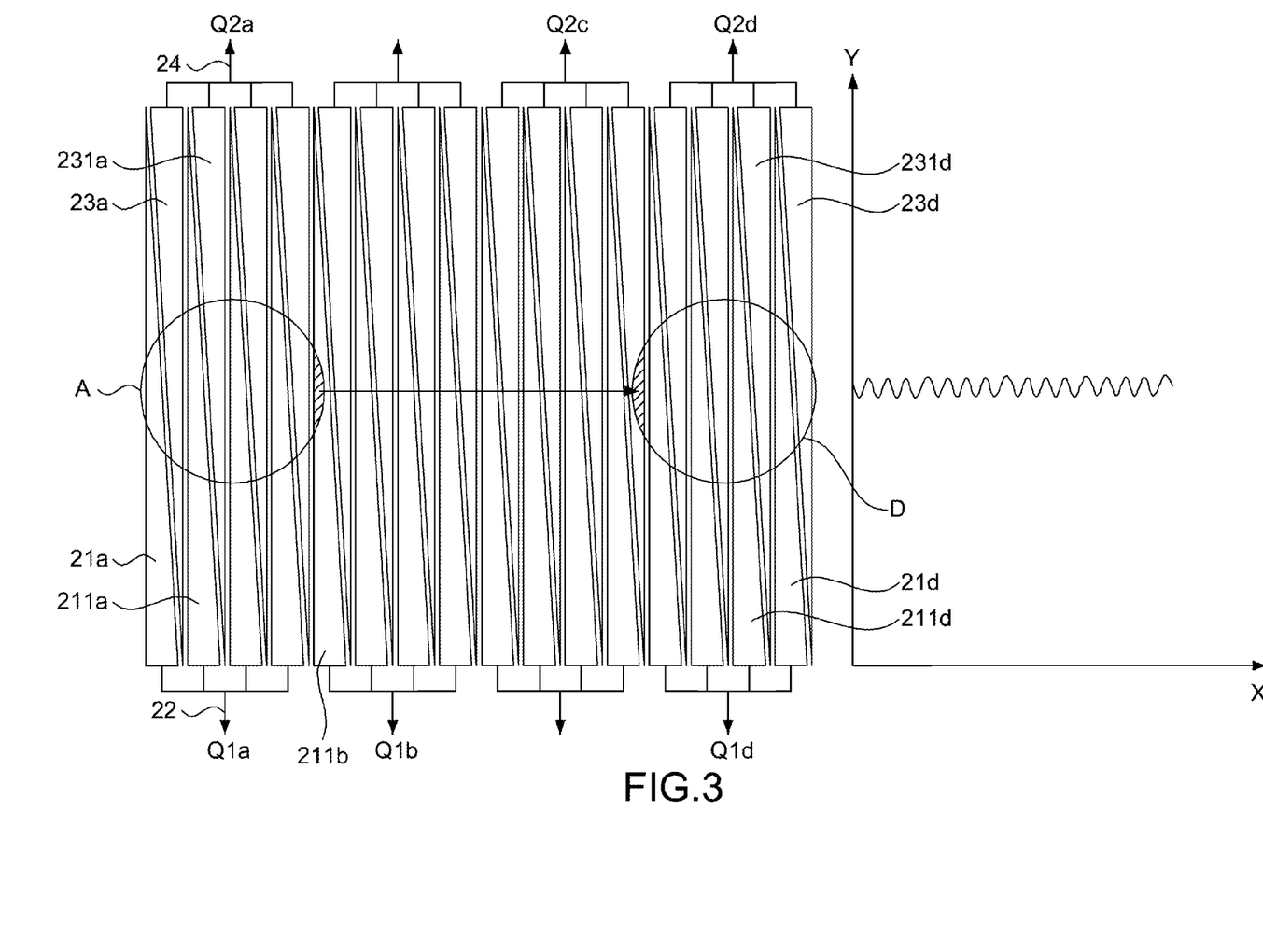
FIG. 3 is the capacitive touch sensing structure with a position touched by a finger in accordance with a first embodiment of the present disclosure.

Referring to FIG. 3, when a user touches an area A on a capacitive touch panel with his finger, the capacitive touch panel senses a capacitance variance Q1a of a plurality of first electrodes 211a of a first electrode group 21a, and a capacitance variance Q2a of a plurality of second electrodes 231a of a second electrode group 23a, with a capacitance variance Q1b of a first electrode 211b being regarded as an error term.

When the user touches an area D on the capacitive touch panel with his finger, the capacitive touch panel senses a capacitance variance Q1d of a plurality of first electrodes 211d of a first electrode group 21d, and a capacitance variance Q2d of a plurality of second electrodes 231d of a second electrode group 23d, with a capacitance variance Q2c of a second electrode 231c being regarded as an error term.

In this embodiment, a first electrode group 21 is divided into four smaller sizes of the first electrodes 211, such that a capacitance variance of each of the first electrodes 211 is relatively smaller. Therefore, the error term is correspondingly reduced, so that an actual position touched by the finger becomes more accurately sensed by the touch panel, i.e., the actual touched position is now closer to the position sensed by the touch panel. When a width of the first electrode group is the same (about a width of a forefinger of an adult person) as that of the first electrode in the prior art, the error term can be controlled within 2 mm, which is much better than the error value of 10 mm in the prior art. Further, production cost is kept under control since the number of conducting wires need not be increased.

Figure 4A:
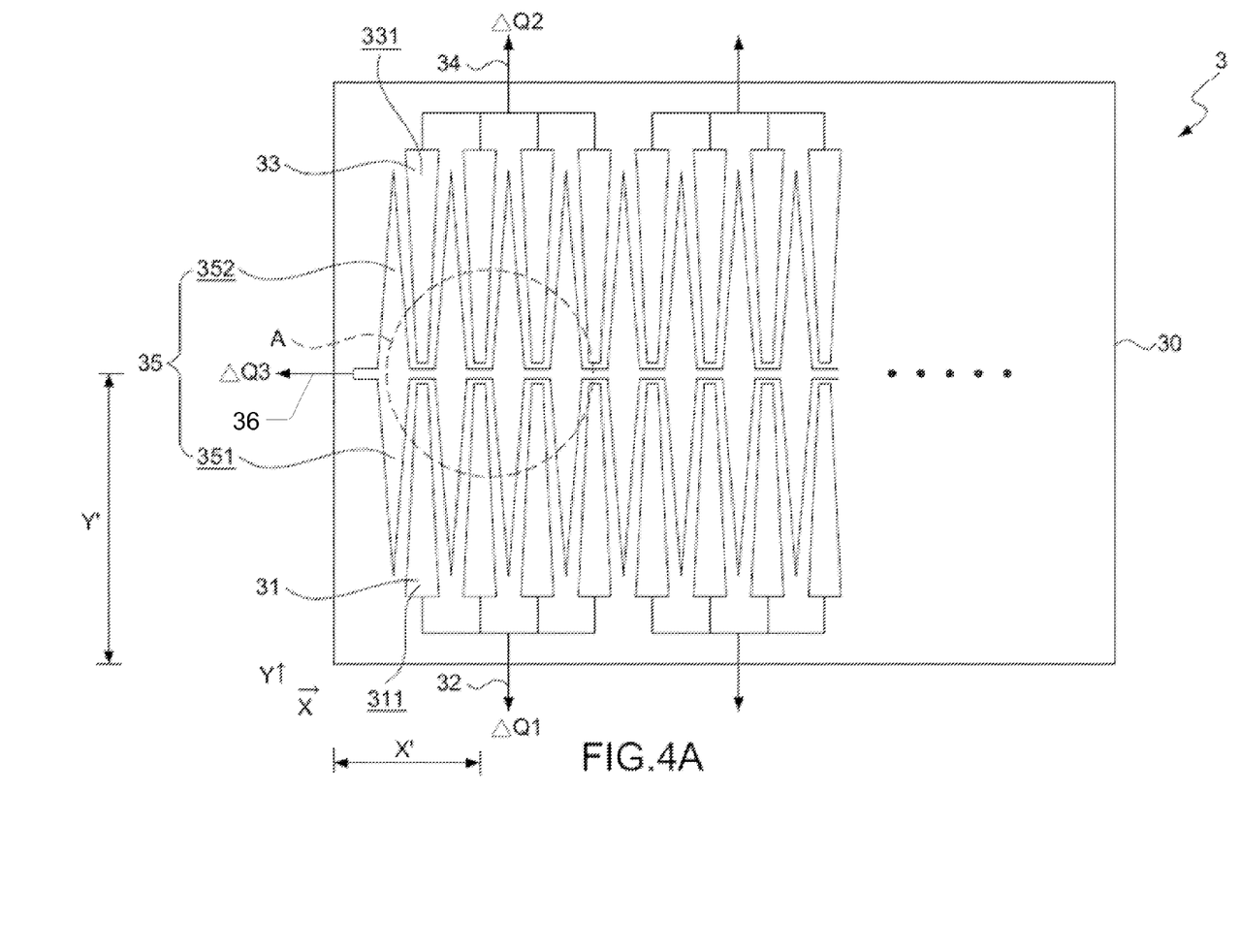
FIG. 4A is a capacitive touch sensing structure in accordance with a second embodiment of the present disclosure.

FIG. 4A shows a capacitive touch sensing structure 3 in accordance with a second embodiment of the present disclosure. The sensing structure 3 comprises a substrate 30, a plurality of first electrode groups 31, a plurality of first conducting wires 32, a plurality of second electrode groups 33, a plurality of second conducting wires 34, a third electrode 35, and a third conducting wire 36.

The substrate 30, e.g., in shape of a rectangle, comprises a first direction X and a second direction Y. The first direction X directs from a first position X1 to a second position X2, and the second direction Y directs from a first position Y1 to a second position Y2.

The first electrode groups 31 are arranged in sequence from the first position X1 towards to the second position X2 in the first direction X. Each of the first electrode groups 31 comprises a plurality of first electrodes 311, which are triangular or trapezoid in shape. Each of the first electrodes 311 has its bottom located at the first position Y1, and its top extended in the second direction Y. In this embodiment, each of the first electrode groups 31 comprising four first electrodes 311 has a width as that of a forefinger of an adult person, and its top reaching a central line of the substrate 30. Preferably, the substrate 30 can be a glass substrate or a flexible substrate.

The first conducting wires 32 respectively correspond to the first electrode groups 31, and each of the first conducting wires 32 comprises a plurality of contacts (four in FIG. 4A) respectively electrically connected to the first electrodes 311 of each of the first electrode groups 31.

The second electrode groups 33 are arranged in sequence from the first position X1 to the second position X2 in the first direction X. Each of the second electrode groups 33 comprises a plurality of second electrodes 331, which are triangular or trapezoid in shape. Each of the second electrodes 331 has its bottom located at the second position Y2 in the second direction Y towards to the first position Y1, so that the second electrode groups 33 corresponds to the first electrode groups 31. In this embodiment, each of the second electrode groups 33 comprises four second electrodes 331, and has a width as that of a forefinger of an adult person. Each of the second electrodes 331 has its top reaching the central line of the substrate 30, and is electrically isolated from the top of each of the first electrode 311.

The second conducting wires 34 respectively correspond to a plurality of second electrode groups 33, and each of the second conducting wires 34 comprises a plurality of contacts (four in FIG. 4A) respectively electrically connected to the second electrodes of each of the second electrode groups 33.

The third electrode 35 comprises a first area 351 and a second area 352, which are triangle or trapezoidal. The first area 351 is staggered with the first electrodes 311 of the first electrode groups 31 in an electrically isolated manner from each other. The second area 352 is staggered with the second electrodes 311 of the second electrode groups 31 in an electrically isolated manner from each other. The third conducting wire 36 comprising a contact is electrically connected to the third electrodes 35.

In this embodiment, the capacitive touch panel serving as a display panel of an electronic apparatus combines a touch control capability with an image display capability. Therefore, the substrate 30 is a transparent glass substrate, and the foregoing first electrodes 311, the second electrodes 331 and the third electrode 35 are transparent electrodes, e.g., ITO or ATO film electrodes. In addition, the capacitive touch panel may be a touch panel without a display capability, of a laptop computer. At this point, the substrate 30, the first and second electrodes 311 and 331, and the third electrode 35 need not be transparent materials.

Figure 4B:
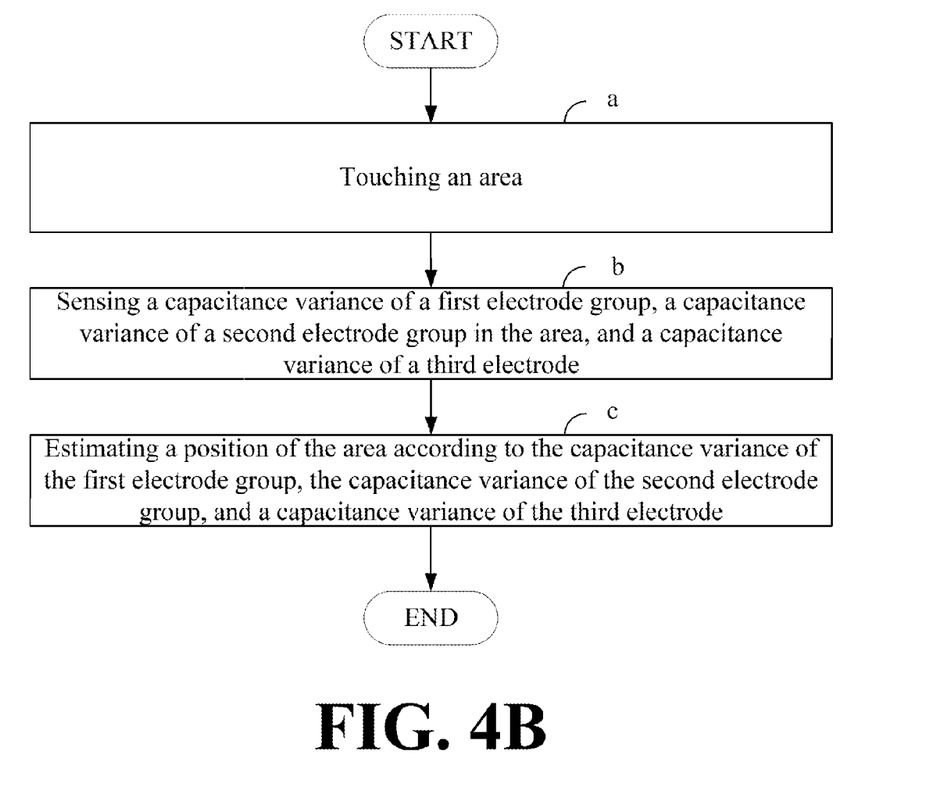
FIG. 4B is a flow chart of a sensing method in accordance with an embodiment of the present disclosure.

FIG. 4B shows a flow chart of a sensing method in accordance with an embodiment of the present disclosure. Also with reference to FIG. 4A, the sensing method comprises steps below.

In Step a, an area A of a touch panel is touched by an external object, e.g., a user touches the area A with his finger, such that a coupling capacitance is formed between the user and the touch panel to change an equivalent capacitance of the area A. The change in capacitance, i.e., the capacitance variance, is associated with a touched area of the finger of the user, and the touched area covers at least one first electrode group 31 and the third electrode 35 (e.g., the lower part of a substrate is touched), or at least one second electrode group 33 and the third electrode 35 (e.g., the upper part of the substrate is touched), or at least one first electrode group 31, at least one second electrode groups 33 and the third electrode 35 (e.g., a central area of the substrate is touched).

In Step b, a capacitance variance $\Delta Q1$ of the first electrode group 31 of the area A, a capacitance variance $\Delta Q2$ of the second electrode group 33, and a capacitance variance $\Delta Q3$ of the third electrode 35 are respectively sensed.

In Step c, a position (Y') of the area A in a second direction of the substrate is estimated, for example, according to a ratio between the capacitance variance $\Delta Q1$ of the first electrode group 31 and the capacitance variance $\Delta Q3$ of the third electrode 35, and a ratio between the capacitance variance $\Delta Q2$ of the second electrode group 33 and the capacitance variance $\Delta Q3$ of the third electrode 35.

A position (X') of the area A in a first direction of the substrate 30 is obtained according to a position in the first direction of the first electrode group 31 or the second electrode group 33 where a change in capacitance occurs.

While the disclosure has been described in terms of what is presently considered to be the most practical and preferred embodiments, it is to be understood that the disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A capacitive touch sensing structure, comprising:
    a substrate;
    a plurality of first electrode groups, arranged in a first direction of the substrate, each of the first electrode groups comprising a plurality of adjacent first electrodes;
    a plurality of first conducting wires respectively coupled to the first electrode groups, with each of the first conducting wires coupled to a respective first electrode group of the plurality of first electrode groups, such that a first capacitance variance of one or more of the first electrodes of one of the plurality of first electrode groups is sensed through a respective one of the first conducting wires;
    a plurality of second electrode groups, arranged in the first direction of the substrate, each of the second electrode groups comprising a plurality of adjacent second electrodes, the second electrodes interleaved with the first electrodes such that every two adjacent first electrodes are interleaved with and immediately adjacent to at least two respective ones of the second electrodes and that every two adjacent second electrodes are interleaved with and immediately adjacent to at least two respective ones of the first electrodes; and
    a plurality of second conducting wires respectively coupled to the second electrode groups, with each of the second conducting wires coupled to a respective second electrode group of the plurality of second electrode groups, such that a second capacitance variance of one or more of the second electrodes of one of the plurality of second electrode groups is sensed through a respective one of the second conducting wires,
    wherein the first electrode groups and the second electrode groups are arranged on the substrate in a way such that a position corresponding to a touch, represented by a first axis and a second axis different from the first axis, is estimated according to the first capacitance variance and the second capacitance variance.

2. The sensing structure as claimed in claim 1, wherein each of the first electrodes of each of the first electrode groups extends in a second direction, that is different from the first direction, towards a first side of the substrate.

3. The sensing structure as claimed in claim 2, wherein each of the second electrodes of each of the second electrode groups extends in the second direction towards a second side of the substrate opposite the first side of the substrate.

4. The sensing structure as claimed in claim 3, wherein the first electrode groups are staggered with and isolated from the second electrode groups.

5. The sensing structure as claimed in claim 2, wherein the first direction and the second direction are substantially orthogonal.

6. The sensing structure as claimed in claim 1, wherein the substrate is transparent, and the first electrodes and the second electrodes are indium tin oxide (ITO) film electrodes.

7. The sensing structure as claimed in claim 1, wherein the first electrodes and the second electrodes are triangular electrodes.

8. The sensing structure as claimed in claim 1, wherein the first electrodes and the second electrodes are trapezoid electrodes.

9. The sensing structure as claimed in claim 1, wherein the substrate is a glass substrate or a flexible substrate.

10. A method for sensing a touched position on a sensing structure, comprising:
    sensing a first capacitance variance by a plurality of adjacent first electrodes of a first electrode group among a plurality of first electrode groups and a second capacitance variance by a plurality of adjacent second electrodes of a second electrode group among a plurality of second electrode groups associated with an area approximate a user's touch, wherein:
        the plurality of first electrodes of the first electrode group among the plurality of first electrode groups are electrically coupled together by a first conducting wire;
        the plurality of second electrodes of the second electrode group among the plurality of second electrode groups are electrically coupled together by a second conducting wire;
        each of the first electrode groups comprises a respective plurality of first electrodes that are arranged in sequence from a first position in a first direction toward a second position in the first direction;
        each of the second electrode groups comprises a respective plurality of second electrodes that are arranged in sequence from the first position in the first direction toward the second position in the first direction;
        the first electrodes and the second electrodes are staggered in an electrically isolated manner, with the second electrodes interleaved with the first electrodes such that every two adjacent first electrodes are interleaved with and immediately adjacent to at least two respective ones of the second electrodes and that every two adjacent second electrodes are interleaved with and immediately adjacent to at least two respective ones of the first electrodes;
        each of the first electrodes has a respective first end located at a first position in a second direction and a respective second end located at a second position in the second direction;
        each of the second electrodes has a respective first end located at the second position in the second direction and a respective second end located at the first position in the second direction; and
    estimating a position of the area in the second direction of the substrate according to the first capacitance variance of the first electrode groups and the second capacitance variance of the second electrode groups.

11. The method as claimed in claim 10, wherein the substrate is a transparent substrate, and the first electrodes and the second electrodes are indium tin oxide (ITO) film electrodes.

12. The method as claimed in claim 10, wherein the first electrodes and the second electrodes are triangular electrodes.

13. The method as claimed in claim 10, wherein the first electrodes and the second electrodes are trapezoid electrodes.

14. A capacitive touch sensing structure, comprising:
    a substrate having a first direction and a second direction, the first direction pointing from a first position to a second position, the second direction pointing from a third position to a fourth position;

a plurality of first electrode groups, arranged from the first position in the first direction towards to the second position in the first direction, each of the first electrode groups comprising a plurality of first electrodes each of which having a bottom end located at the third position in the second direction and a top end extending towards the fourth position in the second direction;

a plurality of first conducting wires respectively coupled to the first electrode groups, with each of the first conducting wires coupled to a respective first electrode group of the plurality of first electrode groups, such that a first capacitance variance of one or more of the first electrodes of one of the plurality of first electrode groups is sensed through a respective one of the first conductive wires;

a plurality of second electrode groups, arranged from the first position of the first direction towards the second position in the first direction, each of the second electrode groups comprising a plurality of second electrodes each of which having a bottom end located at the fourth position in the second direction and a top end extending towards the third position in the second direction;

a plurality of second conducting wires respectively coupled to the second electrode groups, with each of the second conducting wires coupled to a respective second electrode group of the plurality of second electrode groups, such that a second capacitance variance of one or more of the second electrodes of one of the plurality of second electrode groups is sensed through a respective one of the second conducting wires;

a third electrode having a first area and a second area, the first area staggered with and isolated from the first electrodes of the first electrode groups, the second area staggered with and isolated from the second electrodes of the second electrode groups; and at least one third conducting wire, comprising at least one contact coupled to the third electrode, wherein the first electrode groups and the second electrode groups are arranged on the substrate in a way such that a position corresponding to a touch is estimated according to the first capacitance variance and the second capacitance variance.

15. The sensing structure as claim in claim 14, wherein the substrate is transparent, and wherein the first electrodes, the second electrodes, and the third electrode are indium tin oxide (ITO) film electrodes.

16. The sensing structure as claimed in claim 14, wherein the substrate is a glass substrate or a flexible substrate.

17. The sensing structure as claimed in claim 14, wherein the first direction is orthogonal to the second direction.

18. The sensing structure as claimed in claim 14, wherein the first area and the second area are triangular in shape.

19. The sensing structure as claimed in claim 14, wherein the first electrodes, the plurality of second electrodes, the first areas and the second areas are trapezoid electrodes.

20. The sensing structure as claimed in claim 1, wherein the first electrodes and the second electrodes are staggered in an electrically isolated manner such that:

each of at least some of the first electrodes is immediately adjacent to and between respective two of the second electrodes, and each of at least some of the second electrodes is immediately adjacent to and between respective two of the first electrodes.

\* \* \* \* \*